(12) United States Patent
Willett

(10) Patent No.: US 8,844,432 B2
(45) Date of Patent: Sep. 30, 2014

(54) DOUGH CONDITIONING APPARATUS AND METHOD

(75) Inventor: Paul Eaton Willett, Whiteside (AU)

(73) Assignee: Moffat Pty Limited, Mulgrave (AU)

( * ) Notice: Subject to any disclaimer, the term of this patent is extended or adjusted under 35 U.S.C. 154(b) by 1144 days.

(21) Appl. No.: 11/777,105

(22) Filed: Jul. 12, 2007

(65) Prior Publication Data

US 2008/0171120 A1 Jul. 17, 2008

(30) Foreign Application Priority Data

Jul. 13, 2006 (AU) ................................ 2006903775

(51) Int. Cl.
| | |
|---|---|
| *A01J 11/00* | (2006.01) |
| *A23C 3/02* | (2006.01) |
| *A23C 15/04* | (2006.01) |
| *A21C 13/00* | (2006.01) |
| *A21D 8/02* | (2006.01) |

(52) U.S. Cl.
CPC ............... *A21C 13/00* (2013.01); *A21D 8/025* (2013.01)
USPC .............................................. 99/468; 99/483

(58) Field of Classification Search
USPC ................... 99/468, 474, 476, 483, 475, 477
See application file for complete search history.

(56) References Cited

U.S. PATENT DOCUMENTS

| | | | | | |
|---|---|---|---|---|---|
| 3,479,971 | A | * | 11/1969 | Swanson et al. ................. | 426/27 |
| 4,623,780 | A | * | 11/1986 | Shelton .......................... | 219/401 |
| 4,674,402 | A | * | 6/1987 | Raufeisen ....................... | 99/468 |
| 2004/0211765 | A1* | | 10/2004 | McFadden ..................... | 219/400 |
| 2004/0261632 | A1* | | 12/2004 | Hansen et al. .................. | 99/468 |
| 2006/0233929 | A1* | | 10/2006 | Sanders et al. ................. | 426/496 |
| 2007/0137633 | A1* | | 6/2007 | McFadden .................. | 126/21 A |

* cited by examiner

*Primary Examiner* — Henry Yuen
*Assistant Examiner* — Hemant Mathew
(74) *Attorney, Agent, or Firm* — Christensen O'Connor Johnson Kindness PLLC

(57) ABSTRACT

A dough conditioning apparatus for frozen dough including: an enclosure; at least one tray or conveyance for supporting at least one frozen dough piece within the enclosure; a means to direct a conditioning gas directly onto frozen dough within the enclosure; humidity and temperature sensors for respectively measuring the humidity and temperature of the conditioning gas; and a gas controller, the gas controller controlling the duration of the conditioning gas onto the frozen dough according to the output of the humidity and temperature sensor.

12 Claims, 11 Drawing Sheets

DOUGH CONDITIONING APPARATUS AND METHOD

FIELD OF THE INVENTION

This invention relates to a dough conditioning apparatus for thawing frozen dough pieces and a method of thawing dough pieces.

BACKGROUND OF THE INVENTION

In the bakery industry, frozen dough is commonly used for the production and baking of raw dough in on-site bakeries or retail outlets.

The method uses dough pieces which are quickly snap frozen into their frozen shape at a production facility. The frozen dough pieces are transported from the production facility to the retail outlet where they are stored in freezers. When required the frozen dough pieces are thawed. As the dough is already in the shape of the finished product, the thawed dough pieces are placed on baking utensils such as trays for proofing. Once the dough product has doubled in bulk, they are baked to provide the finished product.

This process has a number of advantages and disadvantages. The advantage of this method is that a large variety of low volume product can be produced daily. As the dough is already shaped, a low level of skill is required on the part of the operator and compared with other bakery processes, a smaller floor area is required which is easier to manage and keep clean. As such product is generally sold at smaller retail outlets, there is a synergy with other frozen product which is brought in and baked, such as pastry, pies and cake.

The disadvantages of this method is that the frozen dough pieces are in the shape of the finished product and therefore often bulky to transport. Furthermore the frozen dough pieces must be transported in refrigerated transports increasing the overall costs of the product.

With frozen dough, it is essential that the thawing process is accurately controlled and completed if a consistent quality product is to be produced. In particular, the accumulation of excessive moisture in the dough pieces may lead to difficulties in handling and/or an inferior quality product. The problem is exacerbated when the thawing environment is subject to atmospheric variations.

If a number of different products is required then a number of different types of frozen dough need to be thawed. The shape, thickness, density and type of dough will vary depending on the type of product being produced requiring different timing and conditions for the thawing of each product. Thus if numerous products are to be produced, scheduling of the thawing process and the number of thawers becomes a limiting constraint. Furthermore in order for the thawed dough pieces to prove and rise, it is essential that the yeast culture is protected from the freezing process. This generally requires addition of preservative ingredients to the dough thereby increasing the costs of each frozen item. A further disadvantage is that the frozen item needs to be removed by hand from individual boxes in the freezer to be placed in receptacles in the thawer which is often a time consuming and uncomfortable process for the operator.

The applicant has recently developed an improved baking process. This process is described in applicant's PCT application (PCT/AU2006/000691), the contents of which are incorporated herein by reference. This process provides a thawing processing which is applied to frozen dough pieces in a substantially planar shape in which each of the dough pieces is preferably of the same or similar size and thickness. During the thawing process of the substantially planar frozen dough pieces, warm air is directed onto the centre of the frozen dough piece for a predetermined period of time, to dry and thaw the still frozen surface of the dough.

A limitation of this process is that changes in the thawing characteristics of the warm air stream result in a variable quality product. Therefore, in order to fully utilise the invention described in PCT/AU2006/000691, it is desirable to improve the stated process. Furthermore, by providing an improved thawing process and thawing apparatus, the principles of controlled thawing can be extended beyond thawing substantially planar shaped dough pieces.

Reference to any prior art in the specification is not, and should not be taken as, an acknowledgment, or any form of suggestion, that this prior art forms part of the common general knowledge in Australia or any other jurisdiction or that this prior art could reasonably be expected to be ascertained, understood and regarded as relevant by a person skilled in the art.

SUMMARY OF THE INVENTION

In the first aspect of the present invention there is provided a dough conditioning apparatus for dough including:
  an enclosure;
  at least one tray or conveyance for supporting at least one dough piece within the enclosure;
  a means to direct a conditioning gas directly onto dough within the enclosure;
  humidity and temperature sensors for respectively measuring the humidity and temperature of the conditioning gas in the enclosure; and
  a gas controller
wherein the gas controller controls the duration of the conditioning gas onto the frozen dough according to the output of the humidity and temperature sensors.

The gas controller may also control the temperature of the conditioning gas according to the output of the temperature sensor.

The gas controller may also control the temperature and/or humidity of the gas entering the enclosure. Alternatively, or in addition to, the conditioning gas temperature and/or humidity may be controlled by recirculating at least a portion of the conditioning gas within side the enclosure.

The means to direct conditioning gas may include a plenum having a plurality of outlets. The gas is preferably air.

The dough pieces are preferably frozen dough pieces and the enclosure may be provided with a thawing chamber which receives means to receive trays or other conveyance means to carry at least one dough piece with the plenum outlets directing conditioning gas onto the individual dough pieces in the thawing chamber. The tray or conveyance is preferably received in a fixed or predetermined position relative to the plenum. The tray or conveyance may be further provided with indicia to locate the position of the dough pieces on the tray so that when the dough pieces are loaded into the dough conditioning apparatus they are in predetermined positions relative to the plenum outlets.

The dough conditioning apparatus may further be provided with a further means to heat and humidify the air within the enclosure. This further heating and humidifying means is preferably controlled by the gas controller to provide heating and/or humidification to the enclosure. The further heating and humidifying means may be the primary heating means to the enclosure with the means to direct conditioning gas onto the dough pieces in the thawing chamber used to remove moisture from the surface of the thawing frozen dough.

In the second aspect of the present invention there is provided a method of thawing frozen dough in a dough conditioning apparatus including the steps of
- determining the humidity and temperature of a gas within the dough conditioning apparatus; and
- directing the gas onto the surface of the frozen dough for a predetermined period of time, the period of time being dependent upon the humidity and temperature of the gas.

The method may further include the step of determining the frozen dough temperature and using the frozen dough temperature for calculating the predetermined period of time for directing the gas onto the surface of the frozen dough.

Preferably, the gas is directed onto the surface of the frozen dough towards the end of the thawing period. It is during the thawing period that excessive moisture accumulates on the outer portion of the thawing dough. This is due to the thawing process converting moisture in the dough from the solid or frozen state to the liquid state.

The conditioning gas preferably has a temperature in the range of 20-45° C. and is typically directed onto the dough for a period in the range of 1-15 minutes.

The gas temperature within the enclosure may be initially in the range of 20-38° C., preferably 25-35° C. for a period of 1-45 minutes. The humidity is preferably 30-70% more preferably 40-60%. The initial heating period may be followed by a period of 1-15 minutes, preferably 1-10 minutes where the conditioning gas, in the range of 20-45° C., typically 25° C. flows onto the thawing dough from within the enclosure.

When the humidity of the gas is low (i.e., between 10-30%), the controller may adjust the conditioning gas temperature to greater than 40° C. and less than 50° C. for a period greater than 10 minutes.

When the humidity of the gas is high (i.e., between greater than 75% relative humidity), the controller may adjust the conditioning gas temperature to be greater than 34° C. and less than 40° C. for a period less than 10 minutes, preferably 1 to 7 minutes.

The duration of the conditioning gas flow onto the top surface of the dough pieces is preferably no greater than 15 minutes.

In a third aspect of the present invention there is provided a dough conditioning apparatus for dough including:
- an enclosure;
- at least one tray or conveyance for supporting at least one dough piece within the enclosure;
- a cooling means for reducing the temperature within the enclosure below that of the external environment.
- a means to direct a conditioning gas directly onto at least one frozen dough piece within the enclosure;
- a controller, wherein the controller controls the cooling means to cool and maintain the at least one dough piece in a frozen state within the enclosure for a predetermined time, prior to the conditioning gas heating the dough.

It is preferable that the at least one tray or conveyance are within a thawing chamber in the enclosure.

Preferably, the cooling means is a freezer unit which can freeze the dough or maintain frozen dough in a frozen state.

The dough conditioning apparatus which is essentially a cooler/thawer may also include a humidity sensor and/or temperature sensor for measuring the humidity and/or temperature of the conditioning gas. Preferably, the controller controls the duration of the conditioning gas onto the dough which is preferably frozen or partially thawed according to the output of the humidity sensor and/or temperature sensor.

This embodiment has similar features to the previously described thawer, with the added feature of a cooler unit. The incorporation of the cooler unit enables the dough conditioning apparatus to operate in a slow thaw mode in which frozen dough is loaded into the tray(s) in the enclosure several hours, a day, or more in advance of when the thawed dough pieces are required. Therefore, the controller may deactivate the cooling means and initiate the control of the gaseous environment to provide and maintain thawed dough pieces in gaseous conditions which enhances downstream dough workability and avoids the dough pieces drying out or forming a crust. This process improvement enables frozen product to be loaded into the cooler/thawer at the end of each day, with the thawed product ready to process upon arrival the next day.

In addition to operating in the slow thawing mode, the cooler/thawer may also operate, in a fast thawing mode in a similar fashion to that of the thawer previously described. Thus, the cooler/thawer has the advantage of providing a multi-functional piece of equipment which enables work space and time to be optimised. In particular, the space in a bakery's dedicated refrigerator or freezer is often limited, therefore the ability to transfer frozen dough into the thawer prior to starting the thawing process, provides greater flexibility and hence better equipment utilisation.

In a forth aspect of the present invention there is provided a method of cooling and thawing dough pieces in a cooler/thawer including the steps of:
- cooling or maintaining the temperature of the dough pieces by activating a cooling means;
- controlling the temperature of the dough pieces for a predetermined time;
- deactivating the cooling means and warming the gas environment in the cooler/thawer; and
- directing a gas onto the surface of the frozen dough for a predetermined period of time.

The dough pieces may be cooled to the frozen state or the dough pieces are maintained in the frozen state.

The temperature at which the frozen dough pieces are maintained before gas is directed onto the surface of the frozen dough pieces is preferably −30° C. to 20° C. and more preferably −5° C. to −10° C.

The method may also include the steps of determining the humidity and/or temperature of a gas within the dough conditioning apparatus, with the predetermined the period of time that the gas is directed onto the frozen dough being dependent upon the humidity and/or temperature of the gas.

The method also shares the same features as discussed in relation to the second embodiment of the present invention.

BRIEF DESCRIPTION OF THE DRAWINGS

FIG. 1(b) is a side elevation of the dough conditioning apparatus of FIG. 1a;

FIG. 3(b) is a side elevation view of the dough conditioning apparatus of FIG. 3a;

DETAILED DESCRIPTION OF THE EMBODIMENTS

Figure 1A:
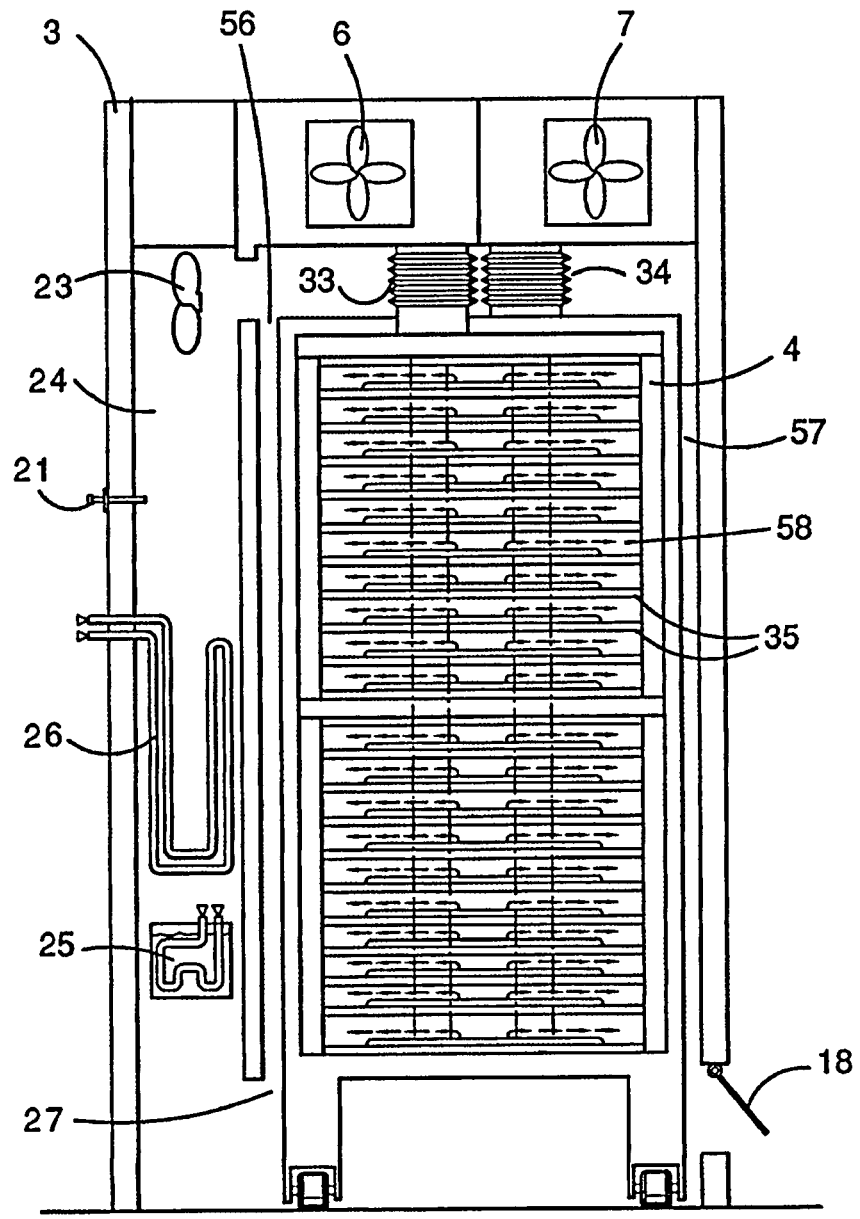
FIG. 1(a) is an end elevation view of a dough conditioning apparatus in accordance with an embodiment of the present invention.
Figure 1B:
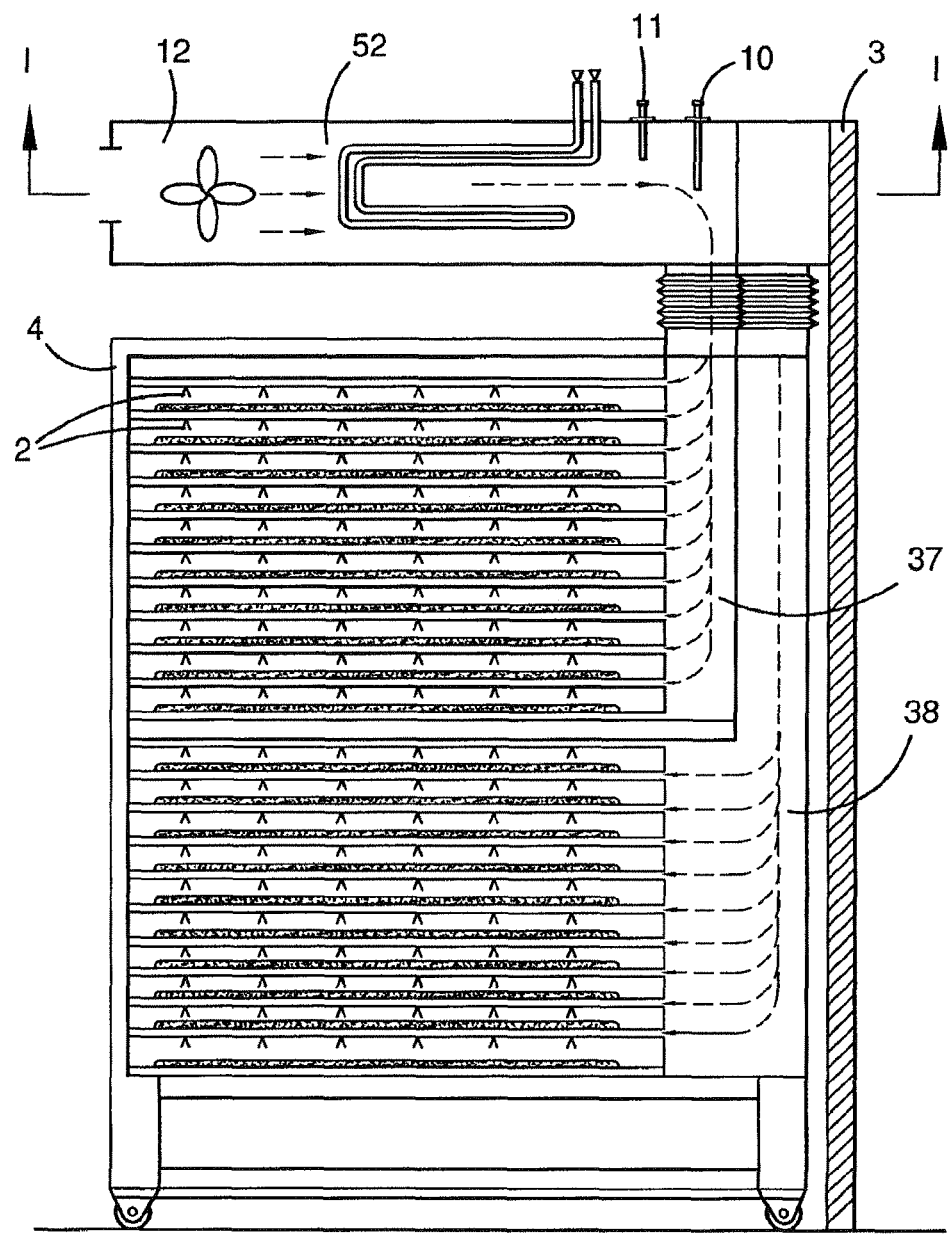
Figure 1C:
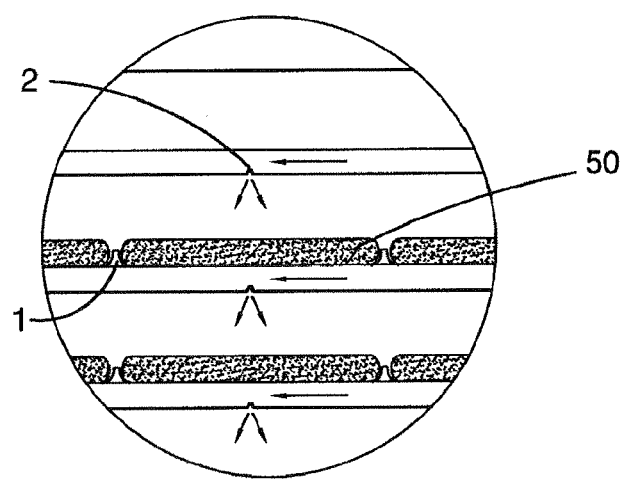
FIG. 1(c) is an exploded view of FIG. 1b, illustrating the flow of the conditioning gas stream onto the frozen dough.

Referring to FIG. 1, a dough conditioning apparatus in accordance to an embodiment of the present invention is shown. The dough conditioning apparatus is preferably designed to thaw flat, frozen dough pieces, in a controlled timely manner.

The dough conditioning apparatus has input sensors to monitor humidity, air temperature in the dough conditioning apparatus, and dough temperature. A faster thaw has been possible by the introduction of conditioning air onto the dough piece, in particular, the top middle area, as this is found to dry the otherwise wet area that occurs on the dough as it thaws and makes the moisture content of the surface of the dough adequate for processing. It has been found that due to variations in atmospheric conditions in the bakery, achieving consistent optimal thawing of the dough has been difficult, with insufficient thawing resulting in excessive moisture, especially in the outer portion of the dough. Likewise, prolonged exposure of the dough piece to the warm air stream also leads to a hardened skin on the dough piece. Both extremes lead to an inferior baked product.

The applicant has found that by providing the frozen dough pieces in a substantially planar shape in which each of the dough pieces is preferably of the same or similar size and thickness, a consistent thawing process can be applied to the frozen dough pieces. In order to produce a variety of products from the similar or identical shaped dough pieces, the thawed or substantially thawed dough pieces then undergo a shaping operation (as described in PCT/AU2006/000691) to present them into the final shape for proofing and baking. This process has the advantage of ensuring that all of the dough is uniformly thawed as required.

The applicant has found that the substantially planar frozen dough pieces are elongate in shape with the width being less than the length of the dough. In preferred forms, it has been found that the length dimension is at least more than 1.5 times the width and preferably about 2 times the width. The dough preferably has two substantially planar surfaces with the distance between the planar surfaces being within the range of 12-25 mm and more preferably 20-24 mm.

The applicant has further found that during the thawing process of a substantially planar frozen dough piece, the shape produces a characteristic thaw pattern. This thaw pattern which is thought to be due to moisture migration from the centre of the dough piece results in moisture pooling on the top of each piece. As the dough thaws, the moist area on the dough becomes sticky making handling of the dough piece difficult.

Attempts to reduce the moisture collection during thawing proved unsuccessful often resulting in the formation of a dry crust on skin around the periphery of the dough piece while the middle often retained a wet surface.

To overcome this problem, the applicant found that directing warm air onto the centre of the frozen dough piece for a predetermined period of time dried the still frozen surface of the dough. While, this process (as described in PCT/AU2006/000691) was effective in environments which had consistent quality warm air, the thawer was susceptible to quality variations due to the variations in the thawing properties of the warm air stream.

The applicants have recently found that by using a controller which determines the appropriate duration of the warm air thawing through monitoring the temperature and humidity of the warm air, the dough pieces can be consistently thawed in a bakery environment with varying atmospheric conditions. Furthermore, by optimising the thawing properties of the warming air, the drying cycle may be significantly reduced, thus increasing the productivity achieved from the thawer. The applicant has also found that by producing thicker frozen dough pieces as described above the wetness of the thawed dough has become more pronounced.

In a preferred aspect, the invention provides a method of thawing frozen dough including the step of directing conditioning gas onto the substantially planar frozen dough piece for a predetermined period of time. The conditioning gas preferably has an initial temperature in the range of 20-45° C. at 5-15 liters per second, preferably 25° C. and preferably at a gas flow of approximately 10 liters per second, per dough piece, equating to a velocity in the range of 5-15 meters per second, preferably of approximately 10 meters per second. The substantially planar frozen dough piece may be subjected to the conditioning gas blast at this temperature for 1-15 minutes preferably 90 seconds to 25 minutes, and more preferably about 3-5 minutes.

The heated gas may be directed onto the frozen dough towards the end of the thawing process. However, to prevent excessive drying of the dough surface, intermittent blasts of gas over variable lengths of time may be used.

The dough conditioning apparatus comprises an enclosure defined by a cabinet 3 with an access door (not shown). It is a design element that more than one such cabinet be placed side by side or above another, so as to permit a variety of different products to thaw over a predetermined period. A series of separating flat ducts or plenum 35, act as floor and ceiling members in thawing chambers 58 in the cabinet, and the trays holding the frozen pieces slide in on this duct.

Figure 1D:
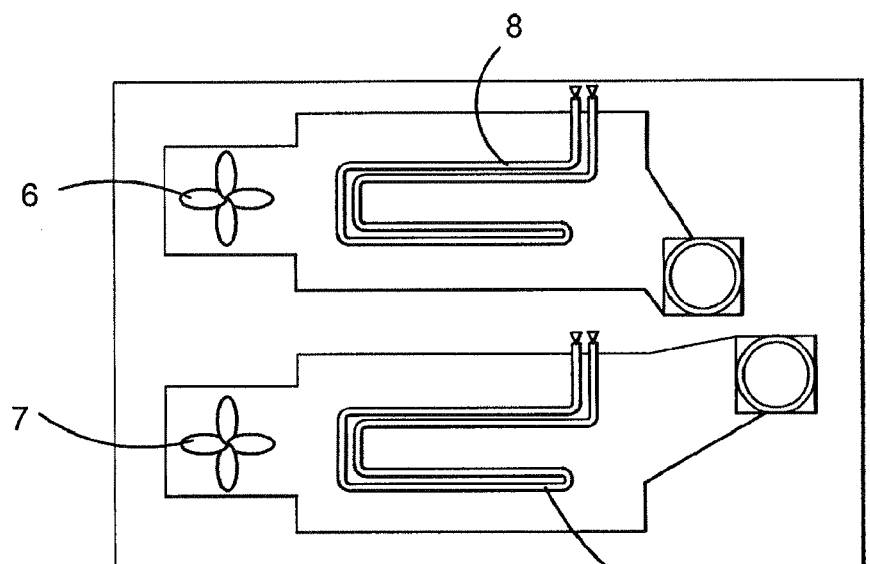
FIG. 1(d) is a top elevation view of the dough conditioning apparatus through line 1-1 of FIG. 1b.

Two fans 6, 7 preferably supply fresh, non returned air to these ducts 35, by way of a collection boxes 52. As shown in FIG. 1(d), each fan has a separate collection box holding an electrical heating element 8, 9. Each fan 6, 7 also has a temperature and humidity sensor 10, 11 positioned at the rear supply duct 12 of each fan system. The fans work independently of one another, and either can be switched on, at any time in the thawing cycle, with each fan supplying conditioning air to separate sections of the thawer The characteristics of the conditioning air stream is controlled by a controller [not shown] which calculates the desired conditioning air stream properties needed to achieved the required amount of thawing. For instance, the controller receives the output from the humidity sensor of 90%, which would result in the controller increasing the air temperature, by way of the heating elements 8, 9 to 38° C. (for example) for an extended period of 15 minutes. Thus, the controller is able to compensate for the lower moisture absorbing capacity of the moist incoming air by increasing the air's temperature (through monitoring the temperature and humidity through the temperature and humidity sensors 10, 11) and extending the period the conditioning air is directed on to the dough pieces. It will be appreciated that the optimal controller setting would be determined through experience or experimentation, with the controller preferably containing a programmable algorithm to automatically adjust the conditioning air temperature and air flow duration depending upon the output from the humidity sensor 10.

Similarly, if the humidity was 20%, the controller may decrease the conditioning air temperature to between 20° C. to 30° C. for 5 to 7 minutes—the low humidity air having a greater capacity to remove excess moisture from the dough pieces. It would be appreciated that the controller may also receive inputs from other sensors. For instance, the controller may increase the air flow (say from 5 meters per second to 15 meters per second) to increase the moisture carrying capacity of the warm air stream.

The fans 6, 7 typically draw air from the bakery atmosphere; however in certain embodiments of the invention at least part or all of the air may be drawn from inside the cabinet or enclosure. This configuration may be particularly advantageous if an increase in conditioning air humidity is preferred. This may be the case if the low humidity of the conditioning air stream promotes a crust on the dough, even with a reduced air temperature and reduced duration of the thawing cycle.

Thus conditioning air of known thawing properties flows through the conditioning air supply conduits 33, 34 into the plenum or ducts 35

Figure 4:
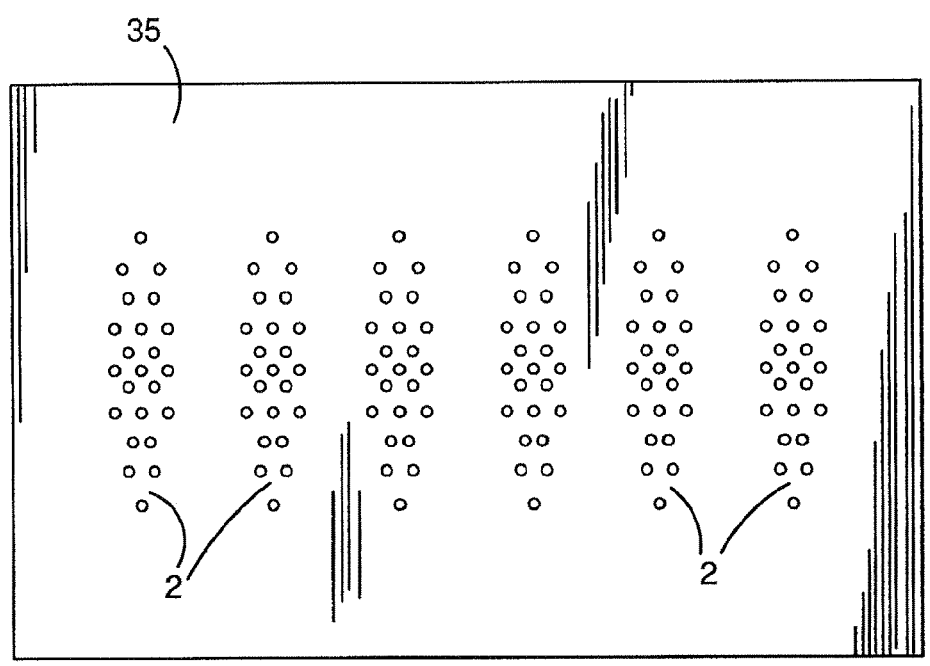
FIG. 4 is a plan view of the of a pattern of distribution holes which direct the conditioning air to the top surface of the dough pieces on the trays of FIG. 2.

A pattern of distribution holes 2 (FIG. 4) are a design element of the duct 35, and these direct the conditioning gas or air to the top surface of the dough piece 1. To meet the heating requirements of the dough conditioning apparatus, the heating element is controllable to deliver air to the thawing chambers through conditioning air supply conduits 33, 34 to the plenum throughout the temperature range of 20-45° C.

The trays 1 holding the dough pieces, are designed to have designated, or predetermined positions for the dough pieces 50, so as to ensure that the air flow from distribution holes or outlets 2 is directed to the middle, top section of each dough piece. Dough pieces naturally dry out on the periphery, so it is vital that air flow to any other area, other than the top or middle is avoided. Once the air is directed to the dough piece, it is best exhausted through ports 59 (not shown) into lateral chambers 56, 57 with the least drying effect to the dough piece.

Figure 5A:
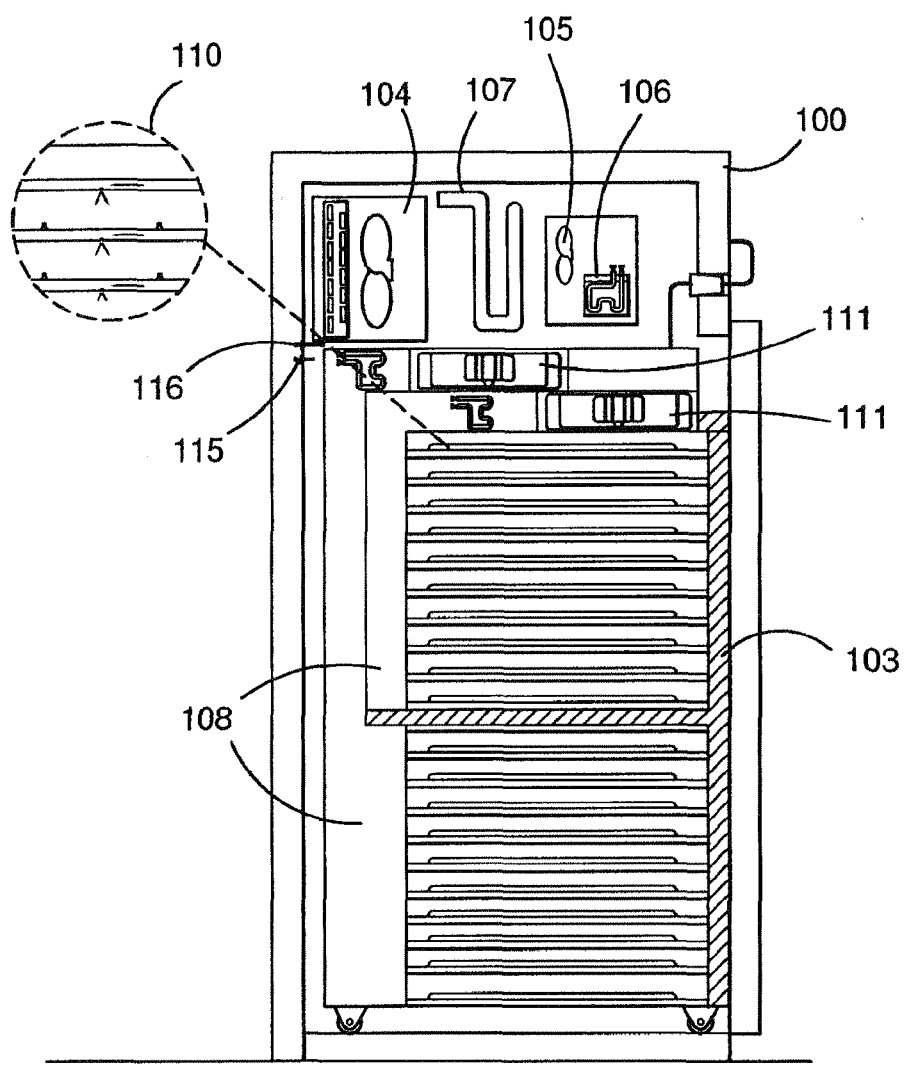
FIG. 5(a) is an end elevation view of a freezer/thawer in accordance with an embodiment of the present invention.
Figure 5B:
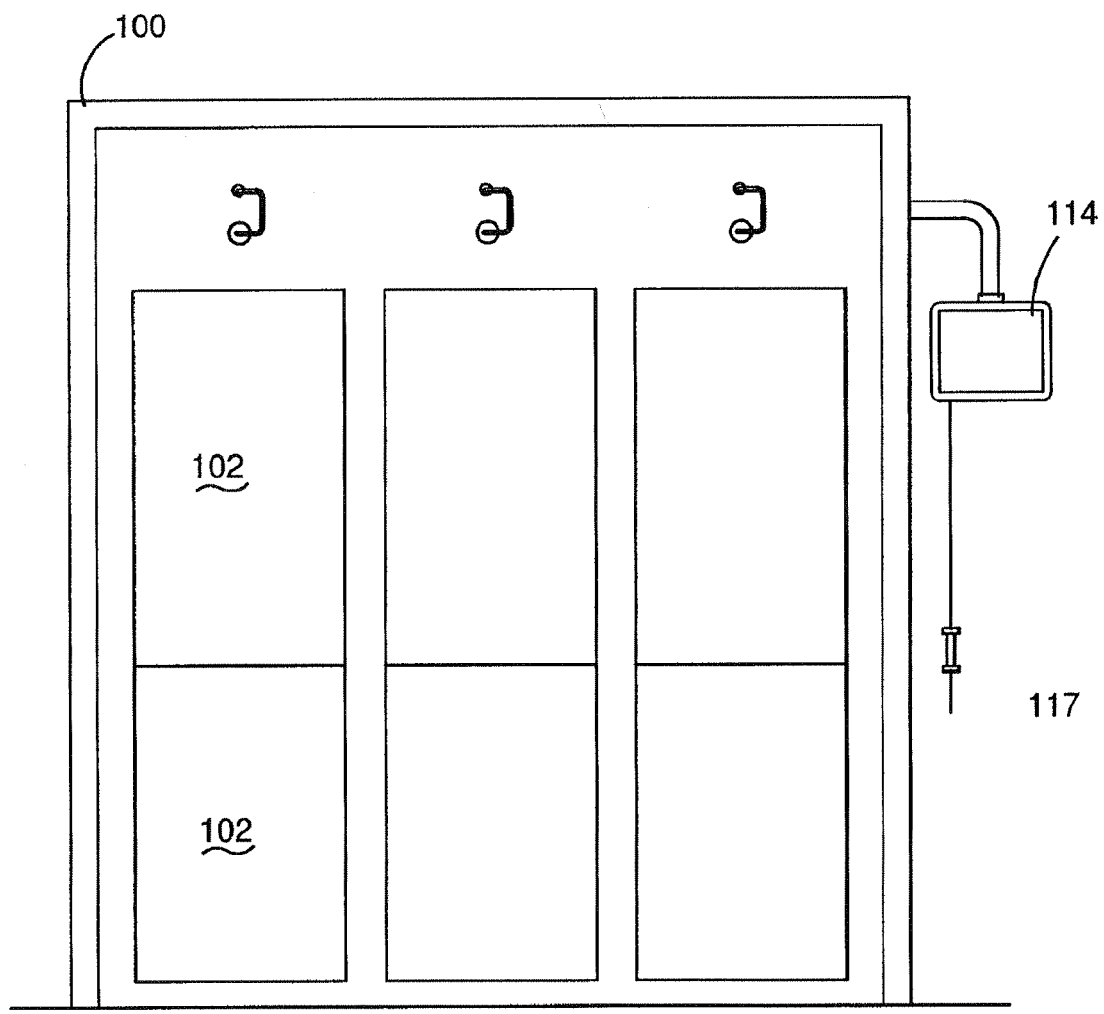
FIG. 5(b) is a side elevation of the freezer/thawer of FIG. 5(a)

In one embodiment, a series of temperature sensors (such as shown at 117 in FIG. 5(b)) are fitted to the cabinet 3 and these are placed under selected dough pieces. The temperature of the dough piece is found to play an important part in timing the period when air flows, and humidity is required. Such inputs are often different for different dough types.

Figure 3A:
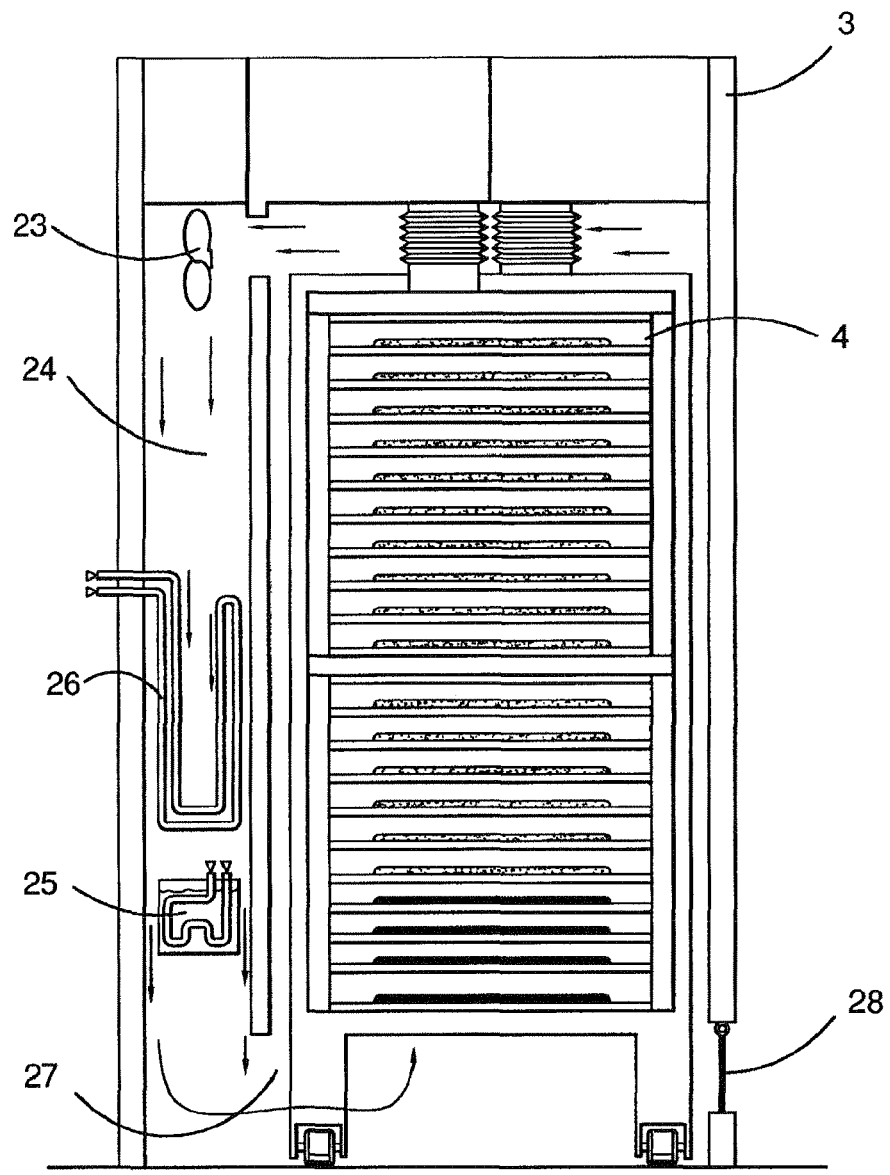
FIG. 3(a) is an end elevation view of the dough conditioning apparatus of FIG. 1a, illustrating the circulation of air within the dough conditioning apparatus.
Figure 3B:
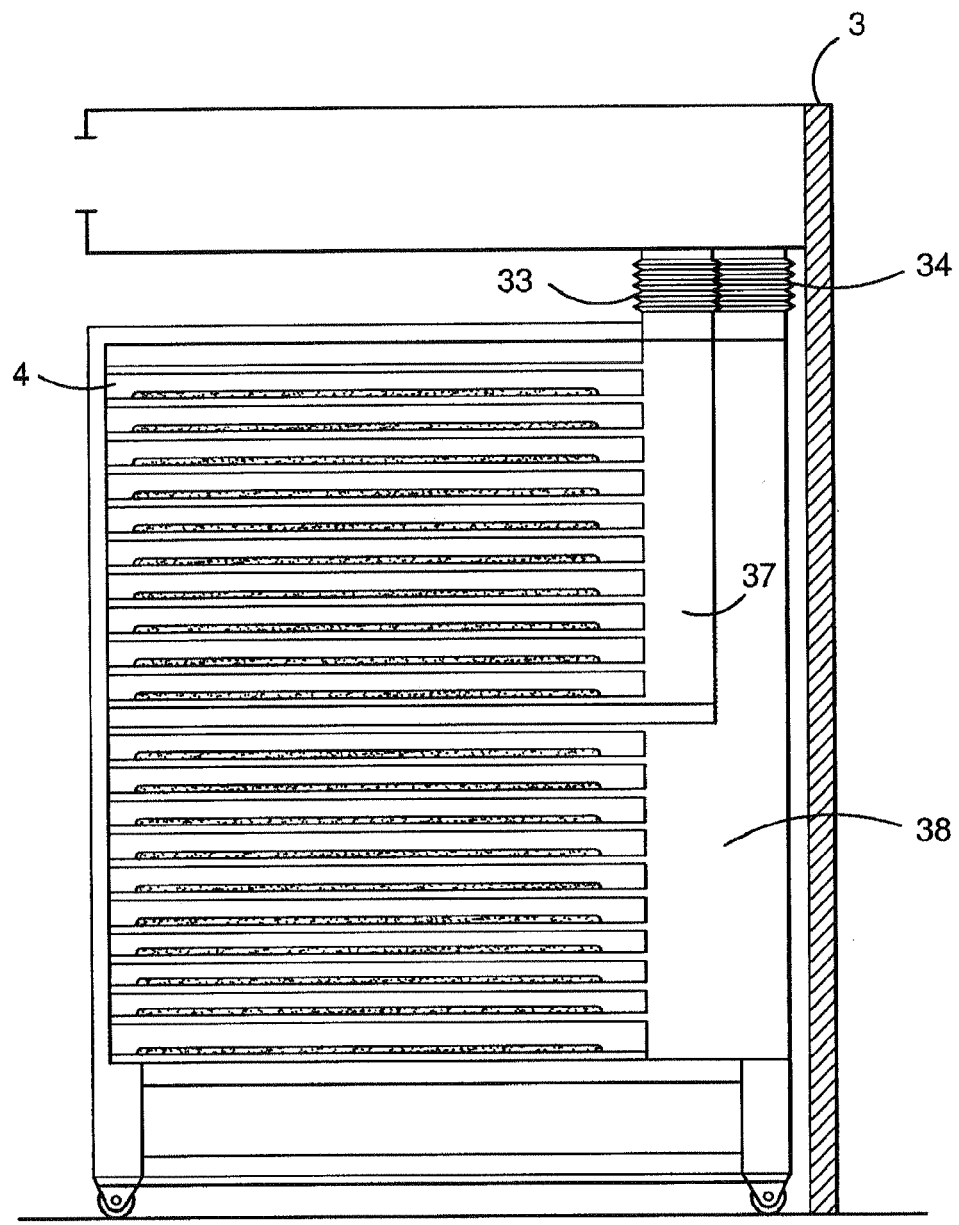

As illustrated in FIGS. 3(a) and 3(b), the cabinet also has a separate heat and humidity supply system that conditions the air in the cabinet at preset temperature and humidity values. This air conditions are typically set at 50% humidity, and 28° C., although this may vary according to the preferred thawing conditions required.

The purpose of this constant air temperature and humidity in the cabinet is to permit a known thaw time for the dough pieces to occur. The system typically has the following components: a recirculating fan 23, a transfer duct 24, a water level controlled boil tank 25, an air heating element 26, and an outlet vent 27 to the cabinet.

In this apparatus, the dough pieces are placed on trays 1, and trays are placed in the rack 4 inside the thaw cabinet 3.

The tray and rack configuration is preferably of a configuration to accept substantially planar dough pieces as previously described. The air in the cabinet is at a preset value of temperature and humidity, and the dough pieces are loaded and timed, in either the top 37 or bottom 38 section of the cabinet. Each section typically thaws 60 dough pieces per batch. It will be appreciated that the thawer could have any number of sections. At any time during the thaw process, the air blast system from fans 6 or 7 can be directed onto the dough piece to dry the central wet area of each dough piece. An exhaust flap 28 permits the air to expel from the cabinet, as the fans 6 or 7, operating independently or together, pump air in by way of the warm air jets 2 (FIG. 1(c)).

The outlet vent can be mechanically opened, or weight balanced to close as pressure reduces in the cabinet 3. It has been found that the cabinet heat and temperature system (23 to 27) may remain in operation while the warm air blast in operating. The pressure of the warm air stream or blast being sufficient to drive away the majority of the cabinet's humid air from on top of the dough piece.

As mentioned above, the dough conditioning apparatus preferably further includes a temperature sensor for measuring the temperature of the conditioning gas within the cabinet 3. The gas controller may also control the temperature of the conditioning gas entering the enclosure. This may be achieved through heating elements 8 and 9. The controller may alternatively, or in addition to, be linked to a temperature controller of the air in fluid communication with the thawer (eg. the room's temperature control system). The gas controller may also control the gas humidity of the conditioning gas through controlling the humidity of the gas in fluid communication with the exterior of the dough conditioning apparatus. The gas controller may also account for the temperature of the at least one frozen dough piece in controlling the duration and velocity of the conditioning gas onto the frozen dough. This may be achieved through a manual input by an operator of the dough initial temperature or via use of a temperature sensor to monitor the temperature of the frozen dough.

Figure 5C:
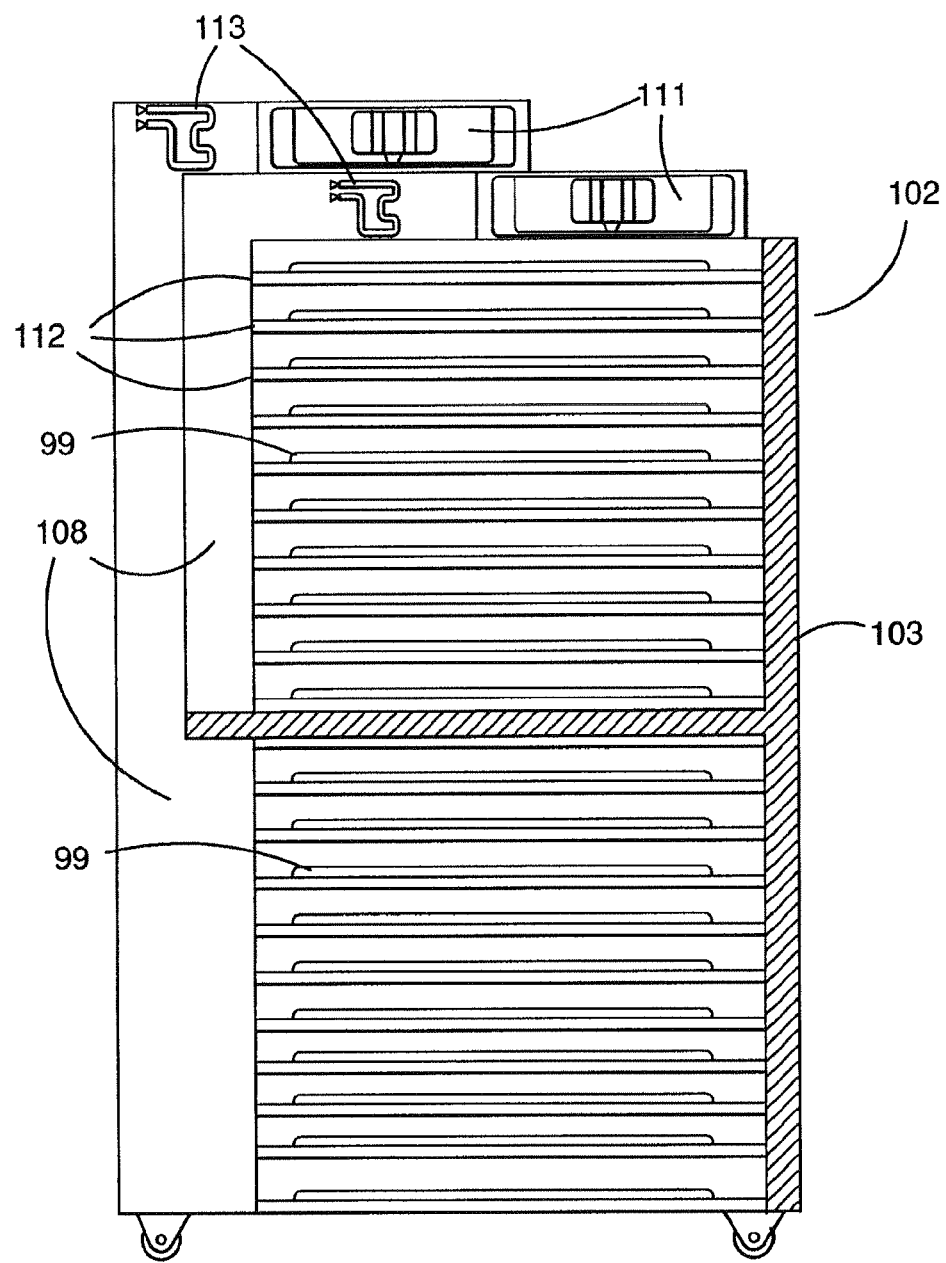
FIG. 5(c) is a part end elevation view of a freezer/thawer of FIG. 5(a) illustrating the flow of gas within the enclosure.

In another embodiment of the present invention, the dough conditioning apparatus also functions as a freezer. As illustrated in FIGS. 5a-c, the thawer freezer cabinet 100 includes insulated panelling of the type typically used in the construction of freezers. The doors 102 are arranged so as to permit access to the top, or bottom half of each rack 103 for holding trays. The cabinet has a freezer unit 104 situated above the racks. This freezer unit may be a typical condenser refrigeration unit. In addition to the freezer unit, there is a humidity and heat generator, comprising a fan 105, a boil tank with heating element 106, and an air heating element 107. The freezer unit is preferably rated to permit the cabinet to run at −5 to −10° C. When the freezer unit is turned off, the heat and humidity generator have the capacity to condition the air in the cabinet to ideal parameters for thawing the frozen dough as described earlier.

Figure 7:
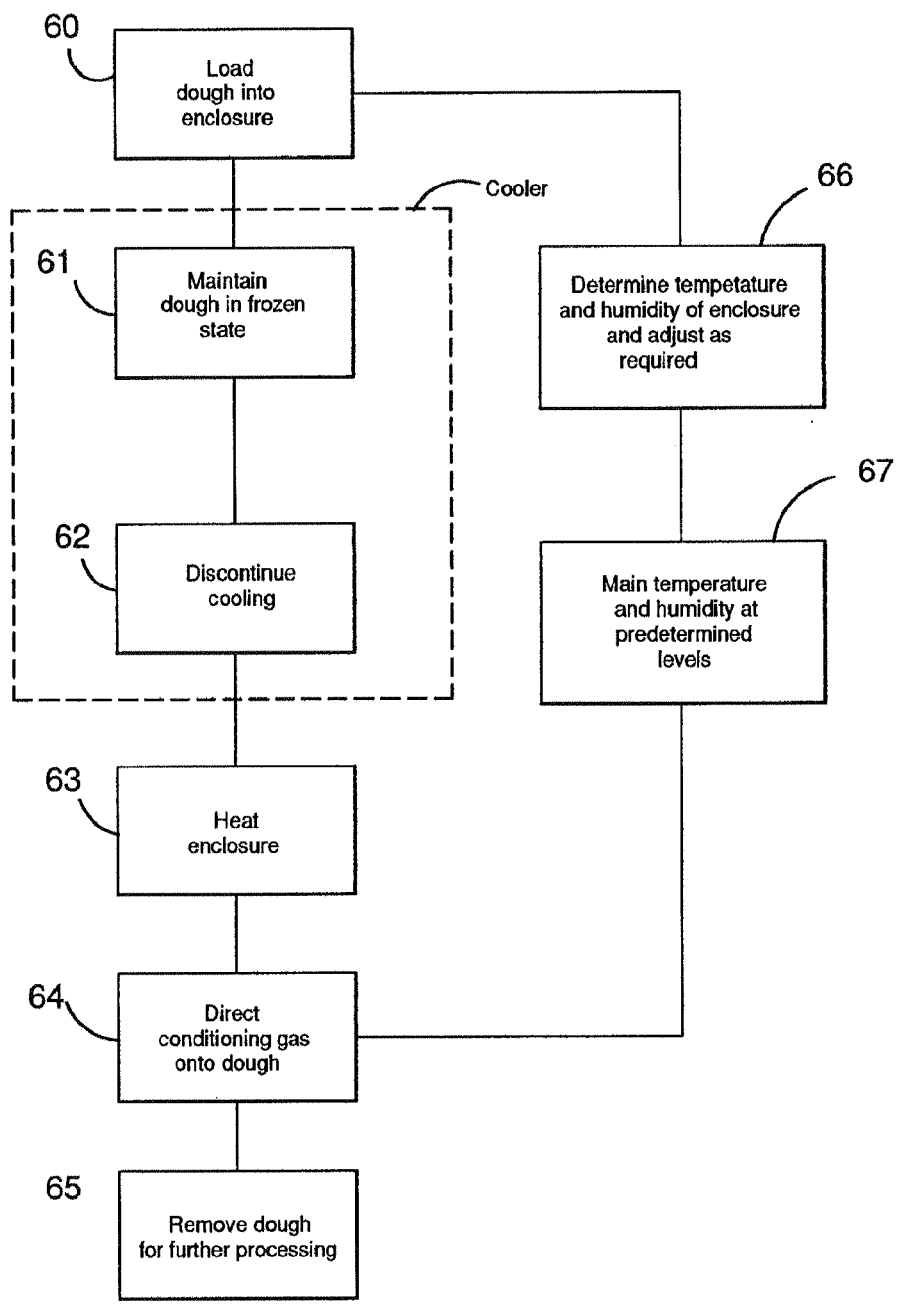
FIG. 7 is a process flow diagram of the operation of the apparatus of the present invention.

FIG. 7 illustrates the operation steps of the freezer/thawer. These include the steps of maintaining the dough in a frozen state 6, discontinue cooling 62 at a predetermined time and heating or conditioning the gas in the enclosure to thaw the dough 63. The dough is then subjected to conditioning gas directly onto the top surface to dry the dough 64 without forming a crust on the dough prior to being removed from the enclosure 65.

The racks 103 on which the dough is thawed is critical to efficient and effective operation of the process. The racks 103, are an assembly of flat separating air ducts supplied by conduits, 108 running between each tray of dough pieces 99. The trays are preferably a vacuum moulded item from plastic or the like, with the tray having recesses moulded in to permit the dough pieces to be positioned centrally under the air blast jets 110. The air blast jets are positioned on the undersides of the ducts 108. A fan 111 (FIG. 5*c*) for each of the top and bottom sections of the rack 103 supplies pressurised air by way of feeder duct 112 which communicates with conduits 108. A heating element 113 supplies heat to the air from the fan 111, but may not always be turned on when the fan is running. A computer 114 times the processes, gathers information from heat and humidity sensors 115 & 116 (FIG. 5*a*), and switches heat and humidity generator 106 so the ratio of heat and humidity is maintained. During the freezing cycle, the computer will regulate the temperature, and be provided with a timer to turn from freeze mode to thaw mode at a predetermined time. A diagnostic probe 117 (typically a temperature sensor), is mounted externally on the cabinet, and is used to maintain a record of dough temperatures so that quality problems in the case of the dough pieces thawing too slow, too fast, or having poor surface condition can be related back to the dough temperature during the thawing process. This information can then be used to prevent these problems in future thawing operations. Thus upon recording circumstances which would lead potential quality problems as outlined above remedial action can be taken such as reducing the temperature increase or decrease in the case of the thawing too quickly or too slowly respectively. Also the air blast could be brought in early if the dough surface is too moist.

In use, the operator places the probe under a dough piece, and the actual dough temperature is checked against a graph (displayed on computer's visual display or equivalent hard copy), to monitor variables such as the actual points where the dough is thawed at +1° C.; the time taken to reach 15° C., (the point where fermentation commences); and the time taken to reach 22° C., and 28° C. The relative humidity and cabinet temperatures are recorded at each stage of the dough thaw and prove (fermentation). Any departure from the recovery graph may be used to diagnose a possible fault, and identify the potential cause. For example, dough that is thawing too fast, when all cabinet readings are correct may indicate that the dough was part thawed before being loaded into the dough conditioning apparatus. Another example would be any sensor readings where the cabinet temperature or humidity has spiked up or down, as a result of doors being opened or left open.

Figure 2:
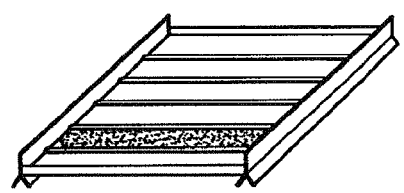
FIG. 2 is a plan view of dough pieces on a tray for positioning in a dough conditioning apparatus.

In general operation (slow thawing mode), the dough pieces are loaded onto the thawer trays 1 (FIG. 2) several hours, a day, or days before being required. The freezer is turned to freezer mode, which initially maintains the temperature of the already frozen dough pieces (eg. at −30° C.), and enables the pieces to stay frozen but increases their temperature to −5° C. to −10° C. This provides a more gradual and prolonged thawing process, thus enhancing the quality of the final product. It is also possible that the freezer may be used to freeze dough pieces from a previous day's production, until the dough is later required (e.g. after baking recommences after a weekend). At a predetermined time, the dough pieces start a slow thaw process, by having the freezer turn off, and the computer unit setting the cabinet heat and humidity generators to achieve cabinet air conditions of 25° C., and 50% humidity respectively. The blast fan 111 may not require any heat input from the heating element 107 at this time, other than the cabinet heat it is drawing in. The dough temperature can be gradually raised to 22° C., where it can be held for many hours before use. This permits the baker to have product to process immediately on start up, and, if the baker arrived late, the product would not be spoilt.

When in use in fast thawing mode, the thawer is loaded again (step 60 in FIG. 7), but now operates on a fast thaw cycle, using the air blast and heat to quickly thaw the frozen dough pieces from the centre outwards. The humidity and temperature is determined (step 66 in FIG. 7) from sensors in the enclosure and adjusted to predetermined values by the heating means and humidifier. The enclosure environment is then maintained at this level during thawing (step 67) followed by directing conditioning gas onto the dough to dry the top surface. The cabinet humidity and temperature permits the air drawn in through the blast fan 111, to dry off the moisture from the dough piece without causing it to form a crust or skin. It has been found that, provided the cabinet heat and humidity are kept within preferred values, the required thaw time can be determined by the computer unit, upon input of the relevant parameters, or through experience (i.e. trial and error), without the need of the diagnostic probe to assess the dough pieces surface temperature, unless a system fault occurs (eg. temperature of humidity sensor fails). Thus, in fast thawing mode, operators can "set and leave", thus freeing up resources without comprising on the quality of the finished product.

Figure 6A:
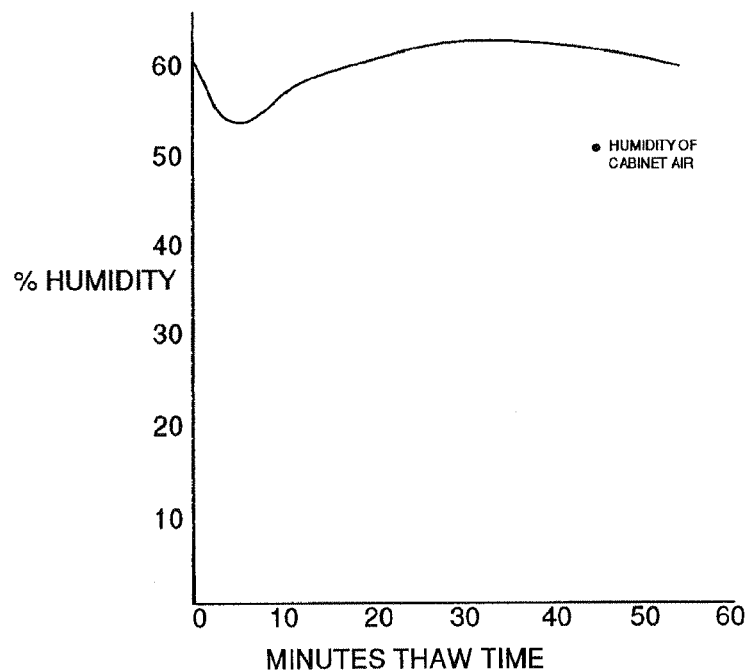
FIG. 6(a) is a graph illustrating the variation of percent humidity over a thawing cycle using an apparatus of the present invention.
Figure 6B:
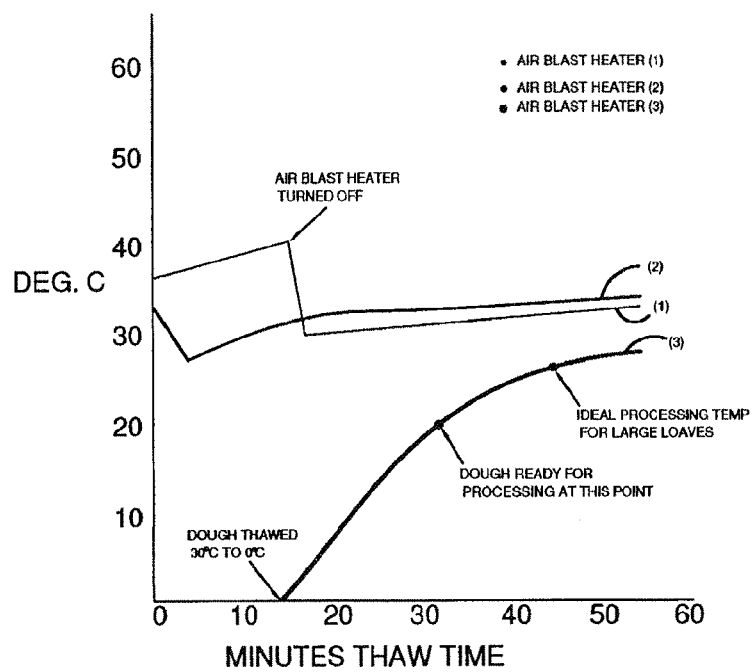
FIG. 6(b) is a graph illustrating the variation of temperature over the thawing cycle of FIG. 6(a)

An example of the variation in humidity and temperature in a typical fast thawing cycle for 400 g dough pieces is illustrated in FIG. 6*a* and 6*b*. The humidity sensor 10, 11 determines the humidity of the air in the cabinet 3. According to the humidity reading, the gas controller calculates the duration of the conditioning gas stream onto the frozen dough (about 15 minutes). The corresponding decrease in the humidity of the cabinet air is indicative of a lower % humidity of the conditioning gas stream in comparison to the initial percent humidity of the cabinet air (about 50%). The heating elements 113 are also turned on for the duration of the conditioning air blast, thus increasing the warm air temperature from about 38° C. to 41° C.

During this initial period in the thawing cycle the dough piece's temperature increases from about −30° C. to about 0° C. The combination of the large temperature difference between the warm air stream and the dough pieces, the humidity of the warm air stream; and the rate of air flowing onto the surface of the dough pieces enables rapid thawing of the dough pieces during this initial phase of the thawing cycle. This contributes to an overall lowering of the thawing cycle without a deterioration in the quality of the dough pieces.

The steady rise of the temperature of the dough pieces enables the optimum processing temperature of the dough piece to be typically reached within about 30 minutes or within about 45 minutes for large loaves (eg. 680 g to 900 g). The dough pieces may be maintained at 22° C. or the temperature may be increased to about 28° C. to provide optimal dough temperature for processing of large loaves.

It will be understood that the application of the conditioning air blast may occur more than once and at different period of the thawing cycle. For instance, one or more blasts of warm air may be applied towards the end of the thawing cycle to avoid the accumulation of moisture in the outer layer of the dough piece, which would otherwise decrease the workability of the thawed dough piece.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A dough thawing apparatus for thawing one or more initially frozen dough pieces prior to baking the dough pieces, the apparatus including:
   (a) an enclosure;
   (b) a heat and humidity supply system for heating and humidifying air within the enclosure;
   (c) a plurality of trays or conveyances for supporting the one or more initially frozen dough pieces within the enclosure; and
   (d) a dough conditioning gas supply system for drying the exposed surfaces of the one or more initially frozen dough pieces supported by the plurality of trays or conveyances comprising:
      (i) a gas collector communicating with the outside of the enclosure, the gas collector including a fan for drawing outside air into the enclosure;
      (ii) a heater for conditioning the air drawn into the enclosure;
      (iii) gas conduits for supplying the conditioned air from outside the enclosure only to ducts overlying each of the trays or conveyances within the enclosure, each overlying duct having one or more outlets, each of the one or more outlets being configured to direct a respective stream of the conditioned air directly onto the one or more initially frozen dough pieces supported by the trays or conveyances at a velocity sufficient to dry the exposed surfaces of the one or more initially frozen dough pieces;
      (iv) humidity and temperature sensors for respectively measuring the humidity and temperature of the conditioned air; and
      (v) a gas controller for controlling the duration during which the conditioned air is directed onto the one or more initially frozen dough pieces according to the humidity and temperature of the conditioned air measured by the humidity and temperature sensors.

2. The dough thawing apparatus of claim 1, wherein the gas controller also controls the humidity of the conditioned air.

3. The dough thawing apparatus of claim 1, wherein the gas temperature in the enclosure is at least in part controlled by recirculating at least a portion of the conditioned air.

4. The dough thawing apparatus of claim 1, wherein the heat and humidity supply system includes a heater that forms the primary heater to the enclosure.

5. A dough thawing apparatus for thawing one or more initially frozen dough pieces prior to baking the dough pieces, the apparatus including:
   (a) an enclosure;
   (b) a heat and humidity supply system for heating and humidifying air within the enclosure;
   (c) a plurality of trays or conveyances each for supporting the one or more initially frozen dough pieces supported on the trays or conveyances within the enclosure;
   (d) a cooler for reducing the temperature within the enclosure below that of the external environment; and
   (e) a dough conditioning gas supply system for drying the exposed surfaces of the one or more initially frozen dough pieces supported by the plurality of trays or conveyances comprising:
      (i) a gas collector communicating with the outside of the enclosure, the gas collector including a fan for drawing outside air into the enclosure;
      (ii) a heater for heating the air drawn into the enclosure to create conditioned air;
      (iii) gas conduits for supplying the conditioned air only to ducts overlying each of the trays or conveyances within the enclosure, one or more outlets located in each overlying duct, each of the one or more outlets in each duct being configured to direct a respective stream of the conditioned air directly onto the one or more initially frozen dough pieces supported by the respective trays or conveyances at a velocity sufficient to dry the exposed surfaces of the one or more initially frozen dough pieces; and
      (iv) a controller for controlling the cooler to cool and maintain the one or more initially frozen dough pieces in a frozen state within the enclosure for a predetermined time, then controls the heater to heat the air directed onto the one or more initially frozen dough pieces to heat the one or more initially frozen dough pieces.

6. The dough thawing apparatus of claim 5, wherein the trays or conveyances are within a thawing chamber located in the enclosure.

7. The dough thawing apparatus of claim 6, wherein the cooler is a freezer unit which can freeze the one or more initially frozen dough pieces.

8. The dough thawing apparatus of claim 5, wherein the dough conditioning gas supply system includes humidity and temperature sensors and wherein the controller controls the duration during which the conditioned air is directed onto the one or more initially frozen dough pieces according to the humidity and temperature of the conditioned air measured by the humidity and temperature sensors.

9. The dough thawing apparatus of claim 5 further including a device for heating the air within the enclosure.

10. The dough thawing apparatus of claim 9 wherein the device also controls the humidity of the air in the enclosure.

11. The dough thawing apparatus of claim 2, wherein the air temperature and humidity in the enclosure are at least in part controlled by recirculating at least a portion of the conditioned air.

12. The dough thawing apparatus of claim 2, wherein the heat and humidity supply system includes a heater that forms the primary heater to the enclosure.

* * * * *